Jan. 13, 1942. R. DE FILIPPIS 2,269,439
HYDRAULIC DIAPHRAGM BRAKE
Filed Sept. 27, 1939
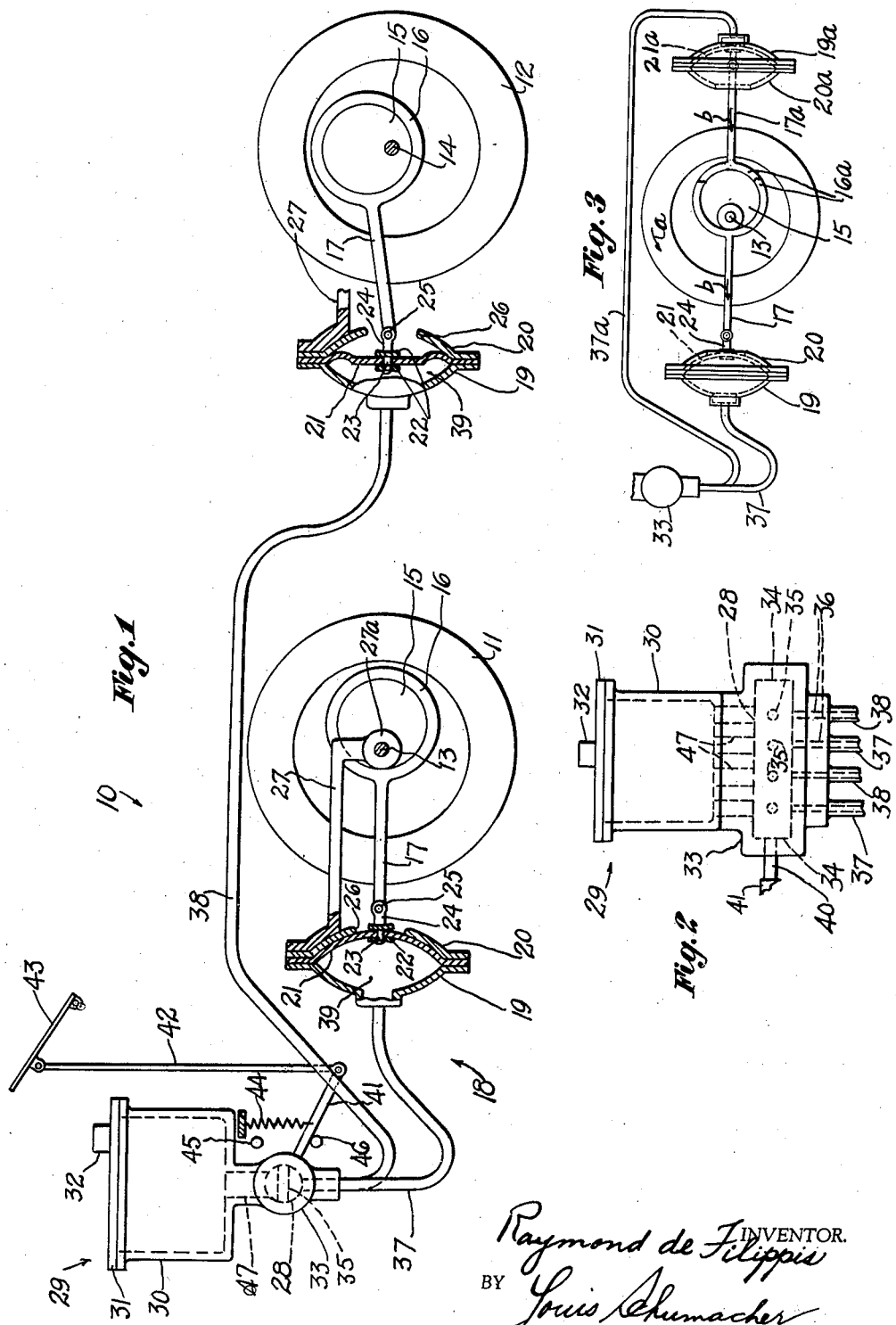
Raymond de Filippis INVENTOR.
BY Louis Schumacher
ATTORNEY.

Patented Jan. 13, 1942

2,269,439

UNITED STATES PATENT OFFICE 2,269,439

HYDRAULIC DIAPHRAGM BRAKE

Raymond de Filippis, Brooklyn, N. Y.

Application September 27, 1939, Serial No. 296,721

6 Claims. (Cl. 188—99)

This invention relates to hydraulic brakes.

One object of the invention is to provide such an improved brake which shall not require the use of pumps for creating the retardation factor.

Heretofore hydraulic brakes have always employed pumps, generally of the reciprocatory type, so that when a suitable valve was closed, movement of the pump piston and hence of a transmission or a shaft was retarded or prevented. These pumps were an element of considerable expense in regard to manufacture, upkeep and consumption of power, and so important were these disadvantages that they prevented such hydraulic brakes from going into general use. The present invention aims to overcome these drawbacks, and it may be noted that it is applicable to hydraulic devices operative with liquid or gaseous fluids.

Another object of the invention is the provision of an improved brake having a fluid responsive vibratable element which is inherently fluid-tight and which is hydraulically controllable to cause a braking action to be exerted for stopping the rotation of a member.

Another object of the invention is to provide an improved brake system comprising a plurality of elements each hydraulically operable in suction and in compression under control of a valve member and the elements being so related that one of them acts in compression while the other acts in suction to thus continuously afford a pressure reaction for braking.

Another object of the invention is to provide an improved brake so simple and inexpensive as to permit a separate one to be provided for each of the four wheels of an automobile, with preferably a single valve control for all of them, so constructed and arranged that if one of the brakes developed a leak, operation of the other brakes would not be affected.

Another object of the invention is the provision of a brake having improved means including an expandible, collapsible hydraulic compartment responsive to the rotation of a member and adapted to successively produce pressure suction conditions in the compartment for braking the member, and with the pressure condition ultimately available to cause the maximum braking action, if required.

A further object of the invention is to provide a device of the character described having relatively few and simple parts, and which is inexpensive to assemble, compact, durable, reliable and efficient in use.

Other objects and advantages of the invention will become apparent as the specification proceeds.

With the aforesaid objects in view, the invention consists in the novel combination and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a diagrammatic view, with parts in section, and certain parts removed, showing a device embodying the invention.

Fig. 2 is a fragmentary end view of a part of the device, including the valve means.

Fig. 3 is a schematic view with parts in elevation showing a modified form of the invention applied to one of the wheels of a car.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Referring in detail to the drawing, 10 denotes a device, such as a power transmission or brake system, embodying the invention. The same may include a rotary means, as, for instance, one or more wheels 11 and 12, the former representing one of the front steering wheels and the latter representing one of the rear drive wheels of an automobile. These wheels are mounted in any conventional or suitable manner. To simplify the drawing, these wheels are shown as mounted on their respective trunnions or shafts 13, 14. Any desired means for converting rotary into reciprocatory motion may include eccentric members 15 connected to said wheels or to the elements 13, 14. Mounted on the members 15 are the eccentric straps 16 having their connecting rod portions 17 engaged with my novel brake means to cause expansible collapsible movement of a hydraulic compartment by flexure of a wall of the latter, as will now be described.

The brake means 18 may include any well known type of expandible-collapsible compartment having a flexible wall, and being operative in response to internal hydraulic pressure. It is understood that the device may have wide or narrow limits of expandibility and of collapsibility. The preferred embodiment of the invention includes a casing having casing sections 19, 20 concaved toward each other and between which is powerfully marginally clamped a disc shaped diaphragm 21 adapted to be supported by said sections in the extreme positions of the diaphragm. The latter may be made of a corded, fluidtight fabric; it may consist of rubber or other suitable flexible material reenforced, if necessary, with a textile fabric or the like which may be impregnated and coated with a fluid tight composition. Unlike a metallic diaphragm, such a diaphragm possesses almost indefinite life, if only it be mounted to avoid the wearing or cutting action of corners or points. And it may have sufficient strength to withstand the highest stresses to which it may be subjected in normal use in an automobile four wheel brake system.

Outwardly dished metallic plates 22 on opposite sides of the diaphragm are interconnected by a central pin 23 to form a strong anchorage carrying a knuckle 24 to which the eccentric rod 17 is pivotally connected as at 25. The casing member 20 may have a concentric opening 26 for the knuckle 24. To maintain accurate spacing between the casings 19, 20 and the wheel centers, and to place the strain at a desirable point, supporting members or bars 27 are connected at one end to the casing members 20 and at their other ends to the members 13 and 14 respectively or to a bearing housing of the latter as schematically indicated at 27a. Of course, additional support for the casings 19, 20 may be provided from the frame of the automobile, or from an auxiliary frame carrying the wheel shafts, but such additional supports need not be shown.

Controlling the diaphragm 21 hydraulically is a valve means 28 which is preferably arranged as a common control for the diaphragms at each of the four wheels of the automobile. Mounting the valve means is a casing 29 which may comprise a liquid reservoir section 30, closed by a plate 31 carrying a vent or breather element 32. At its bottom, the casing 29 may have a casing section 33 for the valve 28. The latter may illustratively consist of a cylindrical bar journaled at its ends in recessed or bearing portions of the casing as at 34, and having one or more transverse openings or passages 35 therethrough for individually controlling the passages 36 to the desirably flexible conduits 37, 38. Of these the conduits 37 may lead to the front wheel diaphragms and the conduits 38 may lead to the rear wheel diaphragms. Thus hydraulic compartments 39 are provided, having flexible walls 21 and being collapsible and expansible by the eccentrics 16 and being controllable by the valve 28.

The valve 28 may be manually operated as by an axial valve stem 40 having an arm 41 connected by a link 42 to a foot pedal 43. A tension coil spring 44 tends to move the arm 41 against a stop 45 to limit the opening movement of the valve. A similar stop 46 may limit the closing movement of the valve under the pressure of the brake pedal.

The operation of the device 10 will now be briefly described. It will be perceived that when the valve 28 is open, the diaphragms merely oscillate to and fro in response to the movement of the automobile, with the gas or liquid in the system moving in part into and out of the reservoir 30 as the compartments 39 expand and collapse. To set the brake in action, the valve 28 is wholly or partially closed, slowly or rapidly as required. Assume that the valve is wholly closed. The diaphragm 21 may be under a stress toward the right or toward the left depending on the position of the eccentric at the given instant. If the stress is toward the left, the hydraulic fluid is under pressure which resists movement of the diaphragm and hence of the eccentric thus retarding or stopping the motion of the wheel. If the stress is toward the right, the hydraulic fluid is subject to greatly reduced pressure or suction which similarly resists movement of the diaphragm to exert its braking action. The use of a liquid is naturally the best as absolute zero pressure is more readily attained on suction. In Fig. 1 the diaphragm is shown at the right so that the pressure condition obtains, in Fig. 2, the diaphragm is shown centrally to illustrate a different position in which either pressure or suction may occur, although in this instance the condition will be one of pressure. Since the automobile wheels may not maintain a synchronous condition it is desirable that the device 10 be operative under both pressure and suction conditions. This is readily attained by making the compartments 39 wholly closed except for the opening action of the valve 28.

The advantages of the present invention in simplicity, cheapness and reliability will be readily apparent. Moreover, if a leak should develop at one of the diaphragms, the others may continue to satisfactorily operate, especially in view of the oil reservoir 30. The latter tends to keep the compartments 39 always full. In fact individual reservoirs are provided for the different compartments, as by providing passages 47 alined with the respective passages 36, and each passage 47 having sufficient capacity to fill the compartment 39 at its maximum volume.

In Fig. 3 is shown a modification of the invention according to a principle such as to afford continuous pressure reaction to exert the braking force of a vehicle. Since the maximum diaphragm stress per unit area is limited in suction, it is desirable that pressure be continuously available in order to permit the use of a substantially higher stress per unit area on the diaphragm, thus permitting the size of the diaphragms to be reduced and to permit of greater braking force to be available. In this figure, the device is shown applied to one wheel, but it will be understood that it may be similarly applied to all of the wheels of an automobile in the same general manner as shown in Fig. 1, except that an additional diaphragm may be provided for each wheel.

Thus I provide an additional diaphragm 21a within a casing 19a, 20a, with the provision of an internal expansible-collapsible compartment at the right of said diaphragm, said compartment being connected by conduit 37a with the valve structure 33. It will be understood that separate passages 35 and 47 are provided for the conduit 37a, in consequence of which there will be twice as many such passages in the valve structure of Fig. 2, if two diaphragms are provided for each of the four wheels of an automobile. Connected to the diaphragm 21a is an arm 17a which may be a rigid part of the eccentric 16a that corresponds to the eccentric 16. It will be understood that as thus far described all of the construction associated with the diaphragm 21a is identical to that provided for the diaphragm 21, and that the expansible-collapsible compartments may in both instances be of like capacity. The essential difference is in the mode of operation, since with the wheel turning in the direction of the arrow a, the arms 17 and 17a will move in the direction of the arrow b. Consequently there will be a pressure resistance to the diaphragm 21 and suction resistance to the diaphragm 21a. When the arms 17, 17a are moving in the opposite direction, the diaphragm 21a will then be subject to pressure resistances, while the diaphragm 21 will be subject to suction resistance. By thus alternating the character of the stress, it will be noted that pressure resistance is available substantially all the time and regardless of the position of the wheel at the instant that the braking force is applied. By the use of a single eccentric structure for both diaphragms, the cost of the device is reduced, but the arrangement shown is intended to be illustrative. The two like eccentrics 16a with their respective rods 17, 17a will have the common eccentric cam 15. A part of one of the eccentrics 16a has been removed in Fig. 3.

I claim:

1. An automobile including a plurality of shafts each adopted to mount one or more wheels, a unit for each wheel having a compartment member having a diaphragm, means interengaging the diaphragms with the different wheels, each means including an eccentric element to cause vibration of the different diaphragms, a relatively stationary valve housing, a single valve member therein, conduits connecting the different compartment members with the valve housing, said valve member having portions for individually controlling the different conduits, said conduits being flexible to permit angular movement of certain wheels for steering movement of the automobile, means mounting on said shafts their respective units for maintaining alinement of said means, said compartments hydraulically restraining the movement of their respective diaphragms when the valve member is in closed position.

2. A device including a plurality of brake units, each unit including a member having a flexible wall and providing a compartment which is expandible-collapsible by movement of said wall, means connecting said member with a rotary means to cause movement of the flexible walls, and a single valve unit for opening and closing the compartments of the different units to interpose different hydraulic resistances to the movement of said flexible walls, said valve unit having different compartments, and individual reservoirs for the valve openings at a side thereof remote from said compartments.

3. A device including a plurality of brake units, each unit including a member having an element movable in opposition to hydraulic pressure developed in the brake unit and providing a compartment which is expandible-collapsible by movement of said element, means connecting said member with a rotary means to cause movement of the element, and a single valve unit for opening and closing the compartments of the different units to interpose different hydraulic resistances to the movement of said elements, said valve unit having different compartments, and individual reservoirs for the valve openings at a side thereof remote from said compartments.

4. A hydraulic brake system for automobiles, a casing, a flexible diaphragm dividing the casing into a first section and a second section, the diaphragm being substantially fully movable into either casing section and being adapted for supporting engagement with the latter, a liquid reservoir, a conduit connecting the reservoir with the first section, a valve in said conduit, said conduit and said first section being liquid-filled, said valve cooperating with the first section to restrict the movement of the diaphragm when the valve is closed and to permit free movement of the diaphragm when the valve is open, the second section having an opening, and means including an eccentric connecting the diaphragm with a wheel of the automobile so that rotation of the wheel causes said movement of the diaphragm, said means comprising a connecting element extending freely through said opening.

5. A hydraulic brake system for an automobile including a casing, a flexible diaphragm mounted in the casing and dividing the same into a first casing section and into a second casing section, a valve controlled conduit connected to the first section for controlling the diaphragm, the conduit and the first section being liquid filled, means including an eccentric for connecting the diaphragm with a wheel of the automobile, and the first and second sections constituting compartments into which the diaphragm can be deflected, with said sections having outer walls of such size and curvature as to fit the diaphragm in its deflected position.

6. A hydraulic brake including a casing, a flexible diaphragm mounted therein, a rotary shaft operatively connected to the diaphragm to vibrate the same, hydraulic means communicating with one side of the diaphragm, a valve for said hydraulic means to cause the same to oppose different required resistances to the diaphragm for a variable braking action on the shaft under the sole control of said valve, and manual means for normally operating the valve, said shaft being angularly movable, means mounting said casing for angular movement with said shaft, said valve being relatively stationary, and the hydraulic means comprising a flexible conduit connected to the casing.

RAYMOND DE FILIPPIS.